United States Patent
Narasimhan et al.

(10) Patent No.: US 7,378,266 B2
(45) Date of Patent: May 27, 2008

(54) PROCESS FOR THE SOLVENT-BASED EXTRACTION OF POLYHYDROXYALKANOATES FROM BIOMASS

(75) Inventors: Karunakaran Narasimhan, West Chester, OH (US); Angella Christine Cearley, Hamilton, OH (US); Michael Steven Gibson, Cincinnati, OH (US); Stanley James Welling, Liberty Township, OH (US)

(73) Assignee: Meredian, Inc., Bainbridge, GA (US)

( * ) Notice: Subject to any disclaimer, the term of this patent is extended or adjusted under 35 U.S.C. 154(b) by 251 days.

(21) Appl. No.: 11/169,450

(22) Filed: Jun. 29, 2005

(65) Prior Publication Data

US 2005/0287654 A1     Dec. 29, 2005

Related U.S. Application Data

(60) Provisional application No. 60/583,773, filed on Jun. 29, 2004.

(51) Int. Cl.
| | |
|---|---|
| *C12N 1/00* | (2006.01) |
| *C12P 7/62* | (2006.01) |
| *C08J 3/00* | (2006.01) |

(52) U.S. Cl. ............... 435/243; 435/135; 528/491; 528/493

(58) Field of Classification Search ............. 435/243, 435/135; 528/491, 493
See application file for complete search history.

(56) References Cited

U.S. PATENT DOCUMENTS

| | | | |
|---|---|---|---|
| 4,140,741 A | 2/1979 | Lafferty et al. | |
| 4,324,907 A | 4/1982 | Senior et al. | |
| 4,562,245 A | 12/1985 | Stageman | |
| 5,894,062 A | 4/1999 | Liddell | |
| 5,942,597 A | 8/1999 | Noda et al. | |
| 6,043,063 A * | 3/2000 | Kurdikar et al. | 435/135 |
| 6,087,471 A | 7/2000 | Kurdikar et al. | |
| 6,340,580 B1 | 1/2002 | Horowitz | |
| 7,244,442 B2 * | 7/2007 | Williams et al. | 424/423 |
| 7,252,980 B2 * | 8/2007 | Walsem et al. | 435/135 |

FOREIGN PATENT DOCUMENTS

| | | |
|---|---|---|
| DE | 19955381 C1 | 2/2001 |
| JP | 09-191893 A | 7/1997 |
| WO | WO 97/07230 | 2/1997 |
| WO | WO 2004/013204 A2 | 2/2004 |

* cited by examiner

*Primary Examiner*—Herbert J. Lilling
(74) *Attorney, Agent, or Firm*—Luedeka, Neely & Graham, P.C.

(57) ABSTRACT

Improved processes for extracting polyhydroxyalkanoate from a biomass containing the polyhydroxyalkanoate including the steps of: combining the biomass containing the polyhydroxyalkanoate with a solvent selected from lower chain ketones, and mixtures thereof to form a biomass liquor wherein the biomass liquor comprises less than about 25% water; mixing the biomass liquor for from about 10 to about 300 minutes at a temperature in the range of from about 70° C. to about 120° C.; separating the polyhydroxyalkanoate from the biomass liquor to form a PHA-enriched liquor, wherein the separating occurs at a temperature of at least about 40° C.; mixing the PHA-enriched liquor with water to form precipitated polyhydroxyalkanoate and an impure solvent liquor, wherein the water is mixed with the PHA-enriched liquor in the ratio of from at least about 0.4-1 parts of water to one part solvent; and recovering the precipitated polyhydroxyalkanoate from the impure solvent liquor. Optional treatment with oxidizing agents or mild surfactant or mild bleach is used to enhance color and odor.

23 Claims, 1 Drawing Sheet

PROCESS FOR THE SOLVENT-BASED EXTRACTION OF POLYHYDROXYALKANOATES FROM BIOMASS

CROSS REFERENCE TO RELATED APPLICATION

This Application claims the benefit of U.S. Provisional Application Ser. No. 60/583,773, filed Jun. 29, 2004.

FIELD OF THE INVENTION

This invention relates to an improved process for the extraction of specific components from other biomass components. More specifically, this invention relates to an improved process for the extraction of polyhydroxyalkanoates from a biological system, such as a plant or a bacterium, by performing the extraction with a solvent.

BACKGROUND OF THE INVENTION

Plastics such as polyesters are typically produced from petrochemical sources by well-known synthetic means. These petrochemical-based polymers take centuries to degrade after disposal. Concern over plastic waste accumulation in landfills has resulted in the recent movement toward using biodegradable polymers instead.

Synthetic biodegradable polymers, also commonly referred to as "bioplastics," have not enjoyed great success in the marketplace due to their high production cost. However, advances in biotechnology have led to less expensive means of production. Specifically, biodegradable aliphatic copolyesters are now often produced by large-scale bacterial fermentation. Collectively termed polyhydroxyalkanoates or "PHAs", these polymers may be synthesized in the bodies of natural or recombinant bacteria fed with glucose in a fermentation plant. Like their petrochemical precursors, the structural, and in turn mechanical, properties of PHAs may be customized to fit the specifications of the desired end product. However, unlike their petrochemical precursors, PHAs degrade both aerobically and anaerobically.

PHAs are enormously versatile, and as many as 100 different PHA structures have been identified. PHA structures may vary in two ways. First, PHAs may vary according to the structure of the R-pendant groups, which form the side chain of hydroxyalkanoic acid not contributing to the PHA carbon backbone. Second, PHAs may vary according to the number and types of units from which they are derived. For example, PHAs may be homopolymers, copolymers, and terpolymers. These variations in PHA structure are responsible for the variations in their physical characteristics. These physical characteristics allow PHAs to be used for a number of products which may be commercially valuable.

However, in order to have any type of commercially marketable PHA bioplastic product, there is a need for identifying microbial organisms that are capable of producing significant quantities of desirable PHA and to identify an efficient process for separating such PHAs from the residual biomass. Improved learnings on the biology of PHA biosynthetic pathways has allowed for the use of microbial organisms to produce significant quantities of PHA.

Numerous solvent-based and other types of extraction techniques are known in the art for extracting PHAs from bacteria and plants (biomass). Solvent-based systems (including those utilizing acetone, ketones, alone and in combination with other solvents), mechanical systems, and combinations thereof may be used for extracting PHA. However, known solvent-based systems are often inefficient and may be difficult to implement with the physical characteristics of certain PHAs (problems with gelling, degradation, etc.) More popular are two-solvent systems, but these two-solvent systems are often expensive due to the duplicated cost of solvent and may also create additional recovery steps when seeking to recover/reuse both solvents.

Therefore, there is a need for a more efficient and cost-saving process for extracting the PHA materials from biomass. Such a process would preferably involve recyclable solvents that are preferably environmentally friendly. In addition, such a process is preferably suitable to large-scale, continuous production of PHA materials.

SUMMARY OF THE INVENTION

The inventors have surprisingly discovered a process for extracting PHA polymers from biomass containing the PHA polymer with improved efficiency and reduced cost.

The present invention therefore relates to an improved process for extracting polyhydroxyalkanoate from a biomass containing the polyhydroxyalkanoate comprising the steps of:

a) combining the biomass containing the polyhydroxyalkanoate with a solvent selected from lower chain ketones and mixtures thereof to form a biomass liquor wherein the biomass liquor comprises less than about 25% water;

b) mixing the biomass liquor for from about 10 to about 300, alternatively from about 10 to about 240 minutes, at a temperature in the range of from about 70° C. to about 120° C.;

c) separating the polyhydroxyalkanoate from the biomass liquor to form a PHA-enriched liquor, wherein the separating occurs at a temperature of at least about 40° C.;

d) mixing the PHA-enriched liquor with water to form precipitated polyhydroxyalkanoate and an impure solvent liquor, wherein the water is mixed with the PHA-enriched liquor in the ratio of from at least about 3 parts water to one part polyhydroxyalkanoate; and e) recovering the precipitated polyhydroxyalkanoate from the impure solvent liquor.

The present invention further relates to the above process wherein the solvent is selected from acetone, methyl ethyl ketone, and mixtures thereof.

The present invention further relates to the above processes wherein the biomass liquor comprises the solvent and the polyhydroxyalkanoate in a ratio of from at least about 5 to about 30 parts solvent to about one part polyhydroxyalkanoate.

The present invention further relates to the above processes wherein the biomass liquor comprises the solvent and the polyhydroxyalkanoate in a ratio of from about 15 parts solvent to about 1 part polyhydroxyalkanoate.

The present invention further relates to the above processes wherein during the step of mixing the biomass liquor, the temperature is from about 70° C. to about 100° C.

The present invention further relates to the above processes wherein during the step of mixing the biomass liquor the mixing is performed by using mixing means selected from propellers, turbines, screw conveyor, and mixtures thereof.

The present invention further relates to the above processes wherein the mixing means has a Power/Volume ratio of from about 0.001 $KW/m^3$ to about 100 $KW/m^3$.

The present invention further relates to the above processes wherein the process is a continuous process wherein during the step of mixing the biomass liquor, the mixing is performed by using a plug flow concept with a screw conveyor.

The present invention further relates to the above processes wherein the mixing of the biomass liquor is conducted for a period of time selected from about 30 to about 300 minutes.

The present invention further relates to the above processes wherein the biomass liquor comprises less than 15% water.

The present invention further relates to the above processes wherein the biomass liquor comprises no measurable quantity of water.

The present invention further relates to the above processes wherein the separating the polyhydroxyalkanoate from the biomass liquor is by filtration and/or centrifugation.

The present invention further relates to the above processes wherein the separating of the polyhydroxyalkanoate from the biomass liquor is by hot filtration and/or hot centrifugation.

The present invention further relates to the above processes wherein the separating of the polyhydroxyalkanoate from the biomass liquor occurs at a temperature of at least about 70° C.

The present invention further relates to the above processes wherein the water is mixed with the PHA-enriched liquor in the ratio of from about 6 to about 8 parts water to about 1 part polyhydroxyalkanoate.

The present invention further relates to the above processes wherein in step (d) the water is added to the PHA-enriched liquor.

The present invention further relates to the above processes wherein in step (d) the PHA-enriched liquor is added to the water.

The present invention further relates to the above processes wherein in step (d) the PHA-enriched liquor and water are mixed together by a means selected from propeller, turbine, high shear, and mixtures thereof.

The present invention further relates to the above processes wherein in step (d) the PHA-enriched liquor and water are mixed together by a means selected from high shear, layers of water coated sheets or moving belts and mixtures thereof.

The present invention further relates to the above processes wherein in the step of mixing the PHA-enriched liquor with water to form precipitated polyhydroxyalkanoate and an impure solvent liquor, the PHA enriched liquor is cooled to a temperature of from about 20° C. to about 45° C.

The present invention further relates to the above processes wherein in step (e), the precipitated polyhydroxyalkanoate recovery from the impure solvent liquor is by filtration and/or centrifugation to produce recovered precipitated polyhydroxyalkanoate and remainder impure solvent liquor.

The present invention further relates to the above processes wherein after recovery by filtration, the recovered precipitated polyhydroxyalkanoate is squeezed and/or pressurized to remove remainder impure solvent liquor water.

The present invention further relates to the above processes wherein in step (e), the recovered precipitated polyhydroxyalkanoate is then washed with a solvent selected from acetone, methyl ethyl ketone, and mixtures thereof.

The present invention further relates to the above processes wherein the process further comprises drying the recovered precipitated polyhydroxyalkanoate.

The present invention further relates to the above processes wherein the process further comprises recycling the wash solvent to extraction directly if the water content in the recycle wash solvent is <15% and recovering and recycling the remainder impure solvent liquor.

The present invention further relates to an improved process for extracting polyhydroxyalkanoate from a biomass containing the polyhydroxyalkanoate comprising the steps of:

a) combining the biomass containing the polyhydroxyalkanoate with a solvent selected from acetone, methyl ethyl ketone, and mixtures thereof to form a biomass liquor wherein the biomass liquor comprises less than about 5% water;

b) mixing the biomass liquor for from about 30 to about 240 minutes at a temperature in the range of from about 70° C. to about 120° C.;

c) separating the polyhydroxyalkanoate from the biomass liquor to form a PHA-enriched liquor, wherein the separating occurs at a temperature of at least about 50° C.;

d) mixing the PHA-enriched liquor with water to form precipitated polyhydroxyalkanoate and an impure solvent liquor, wherein the water mixed with the PHA-enriched liquor in the ratio of from about 5 parts to about 30 parts water to about one part polyhydroxyalkanoate; and e) recovering the precipitated polyhydroxyalkanoate from the impure solvent liquor; wherein the polyhydroxyalkanoate comprises at least two randomly repeating monomer units, wherein the first randomly repeating monomer unit has the structure:

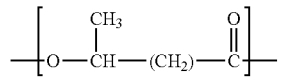

and the second or higher randomly repeating monomer unit has the structure:

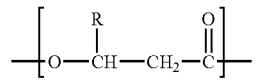

wherein R is a $C_2$ to $C_7$ alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer.

The present invention further relates to an improved process for extracting polyhydroxyalkanoate from a biomass containing the polyhydroxyalkanoate comprising the steps of:

a) combining the biomass containing the polyhydroxyalkanoate with acetone to form a biomass liquor wherein the biomass liquor is substantially free of water;

b) mixing the biomass liquor for from about 30 to about 120 minutes at a temperature in the range of from about 70° C. to about 100° C.;

c) separating the polyhydroxyalkanoate from the biomass liquor to form a PHA-enriched liquor, wherein the separating occurs by filtration at a temperature of at least about 70° C.;

d) mixing the PHA-enriched liquor with water to form precipitated polyhydroxyalkanoate and an impure solvent liquor, wherein the water is mixed with the PHA-enriched liquor in the ratio of from about 5 parts to about 30 parts water to about one part polyhydroxyalkanoate; and e) recovering the precipitated polyhydroxyalkanoate from the impure solvent liquor.

f) treating the precipitated polyhydroxyalkanoate with oxidizing agents, mild surfactants or mild bleaches to enhance color and odor.

DETAILED DESCRIPTION OF THE INVENTION

Figure 1:
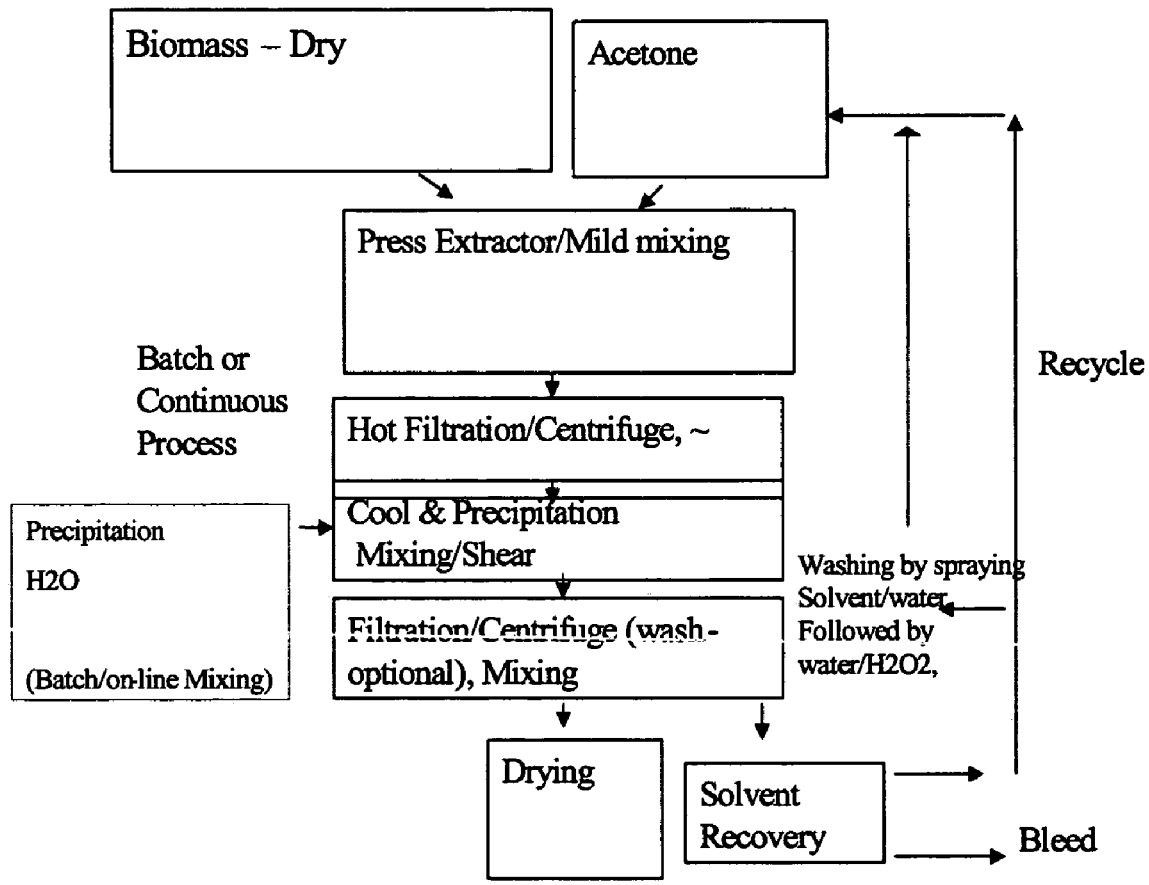
FIG. 1 sets forth a schematic of an embodiment of the features detailed herein, in block form, comprising the mixing, separating, precipitating, drying and recovery steps.

While the specification concludes with the claims particularly pointing out and distinctly claiming the invention, it is believed that the present invention will be better understood from the following description.

All documents cited in the Detailed Description of the Invention are, in relevant part, incorporated herein by reference; the citation of any document is not to be construed as an admission that it is prior art with respect to the present invention.

All percentages and ratios used herein are by weight of the total composition and all measurements are made at 25° C., unless otherwise designated.

"Comprising" means that other steps and other ingredients, which do not affect the end result, can be added. This term encompasses the terms "consisting of" and "consisting essentially of".

Several processes by which PHAs may be extracted from biomass are described in the art. These processes include PHA extraction though the use of enzymes, chemicals, mechanical means, and solvent extraction, including extraction through the use of acetone and ketones. Without being limited by theory, it is believed that the use of acetone under particular conditions (a) maximizes both the yield and purity of the extracted PHAs; and (b) minimizes the number of steps in the overall extraction process and therefore at least partially accomplishes the objective of economical, commercial extraction of PHAs.

The previously described embodiments of the present invention may have many surprising advantages over the current practice. For instance, the extraction process disclosed in the present invention may allow for improved yield and/or purity and/or reduced costs. Without being limited by theory, it is believed that the present invention may also allow for more efficient use of a continuous process due to an increase in process reliability and robustness associated with large scale production according to the processes herein.

Another surprising advantage of the present invention is the ability it confers to extract PHAs at lower temperatures (below 150° C.). Without being limited by theory, temperature considerations are important from a commercial standpoint, since the temperature at which a polymer is at least partially solubilized, and the time required for adequate solubilization, can impact capital costs and product quality. For instance, PHAs that have been subjected to lower temperatures for shorter periods of time are typically of higher quality and increased usefulness in downstream manufacturing processes.

The processes and methods herein may also include a wide variety of other variations. The processes and methods of the present invention are described in detail hereinafter.

The present invention relates to an improved process for extracting PHAs from a biomass using a solvent selected from acetone, methyl ethyl ketone, lower chain ketones, and mixtures thereof under selected process conditions. As used herein, the phrase "extracting PHAs from a biomass", in addition to referring to the extraction of the PHAs produced by a biomass which only produces a single type of PHA, also refers herein to the extraction of one or more types of PHA when the biomass produces more than one type of PHA.

The steps of this process are as follows:

I. Combining the Biomass Containing the Polyhydroxyalkanoate with a Solvent to Form a Biomass Liquor a) Biomass Containing PHA Polyhydroxyalkanoates ("PHAs") are extracted via the process of the present invention from sources including, but not limited to, single-celled organisms, such as bacteria or fungi, and higher organisms, such as plants. These sources are collectively referred to herein as "biomass". While biomass may be comprised of wild-type organisms, they are preferably genetically manipulated species specifically designed for the production of particular PHAs of interest to the grower. Such genetically manipulated organisms are made through the known processes of inserting foreign DNA, which is derived from bacteria that naturally produce PHAs into another organism.

The biomass containing the PHAs useful herein are preferably substantially dry. As used herein, "substantially dry biomass" refers to biomass that contains less than 5% water. Dry biomass is comprised of biomass from which liquid has been removed using processes including, but not limited to, spray or freeze drying, before the extraction process is initiated. In one embodiment, the biomass contains less than 2% water, alternatively, the biomass contains less than 0.1% water, alternatively, the biomass contains no detectable level of water.

Plants useful as biomass in the present invention include any genetically engineered plant designed to produce PHAs. Preferred plants include agricultural crops such as cereal grains, oilseeds and tuber plants; more preferably avocado, barley, beet, broad bean, buckwheat, carrot, coconut, copra, corn (maize), cottonseed, gourd, lentil, lima bean, millet, mung bean, oat, oilpalm, pea, peanut, potato, pumpkin, rapeseed (e.g., canola), rice, sorghum, soybean, sugarbeet, sugar cane, sunflower, sweet potato, tobacco, wheat, and yam. Such genetically altered fruit-bearing plants useful in the process of the present invention include, but are not limited to, apple, apricot, banana, cantaloupe, cherry, grape, kumquat, tangerine, tomato, and watermelon. Preferably, the plants are genetically engineered to produce PHAs pursuant to the methods disclosed in Poirier, Y., D. E. Dennis, K. Klomparens and C. Somerville, "Polyhydroxybutyrate, a biodegradable thermoplastic, produced in transgenic plants'" SCIENCE, Vol. 256, pp. 520-523 (1992); and/or U.S. Pat. No. 5,650,555 to Michigan State University, issued Jul. 22, 1997. Particularly preferred plants are soybean, potato, corn, and coconut plants genetically engineered to produce PHAs; more preferably soybean.

Bacteria useful in the present invention include any genetically engineered bacteria designed to produce PHAs, as well as bacteria which naturally produce PHAs. Examples of such bacteria include those disclosed in NOVEL BIODEGRADABLE MICROBIAL POLYMERS, E. A. Dawes, ed., NATO ASI Series, Series E: Applied Sciences—Vol. 186, Kluwer Academic Publishers (1990); U.S. Pat. No. 5,292,860 to Kanegafuchi Kagaku Kogyo Kabushiki Kaisha, issued Mar. 8, 1994; U.S. Pat. No. 5,250,430 to Massachusetts Institute of Technology, issued Oct. 5, 1993; U.S. Pat. No. 5,245,023 to Massachusetts Institute of Technology, issued Sep. 14, 1993; and/or U.S. Pat. No. 5,229,279 to Massachusetts Institute of Technology, issued Jul. 20, 1993.

It is preferable that the biomass contain a sufficient quantity of polyhydroxyalkanoate ("PHA") to make the extraction process described in the present invention economically desirable. Preferably, the initial content of PHAs in the biomass source material should be at least about 20% of the total dry weight of the biomass; alternatively at least 50%; alternatively, at least about 60%.

b) Structurally flexible PHAs:

In one embodiment, the PHAs of the present invention are selected from those referred to herein as "structurally flexible" PHAs to underscore that the physical disruption caused by the relatively high co-monomer content and relatively long R-group chain length, make them generally more ductile and harder to crystallize than PHAs that are characterized by lower co-monomer content and shorter R-pendant groups (see U.S. Pat. No. 6,043,063 to Monsanto, issued Mar. 28, 2000, and/or U.S. Pat. No. 6,087,471 to Monsanto, issued Jul. 11, 2000).

The structurally flexible PHAs useful in the present invention are in one embodiment comprised by at least two randomly repeating monomer units, wherein the first randomly repeating monomer unit has the structure:

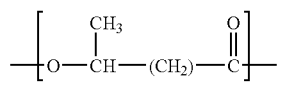

and the second or higher randomly repeating monomer unit has the structure:

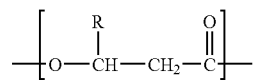

wherein R is a $C_3$ to a $C_7$ alkyl or a mixture thereof; wherein from about 75 mol % to about 99 mol % of the randomly repeating monomer units have the structure of the first randomly repeating monomer unit, and from about 1 mol % to about 25 mol % of the randomly repeating monomer units have the structure of the second randomly repeating monomer unit. Such structurally flexible PHAs preferably have a melt temperature ("Tm") of about 80° C. or higher.

c) Solvent:

The biomass, containing the PHA, is combined with a solvent to form a biomass liquor. Although water may be used as a solvent in certain applications, as used herein, the term "solvent" does not include water. Solvents useful herein are selected from lower chain ketones. Lower chain ketones include those ketones having a carbon chain length of $C_3$ or fewer. Lower chain ketones useful herein include acetone, methyl ethyl ketone, and mixtures thereof. In one embodiment, the solvent is acetone.

In one embodiment, the biomass liquor contains the solvent and the polyhydroxyalkanoate in a ratio of at least about 5 parts solvent to about one part polyhydroxyalkanoate. In another embodiment, the biomass liquor contains the solvent and the polyhydroxyalkanoate in a ratio of from about 5 to about 30 parts solvent to about one part polyhydroxyalkanoate. In another embodiment, the biomass liquor contains the solvent and the polyhydroxyalkanoate in a ratio of from about 10 parts solvent to about 1 part polyhydroxyalkanoate; alternatively in a ratio of from about 20 parts solvent to about 1 part polyhydroxyalkanoate; alternatively from about 15 parts solvent to about 1 part polyhydroxyalkanoate. In one embodiment, the biomass contains from about 3.2% to about 9% of PHA in solution, alternatively the biomass contains about 6.25% in solution.

The biomass liquor contains less than about 25% water; alternatively less than about 15%, alternatively less than 8%, alternatively less than about 5% water, alternatively less than about 2% water, alternatively, the biomass liquor contains no measurable quantity of water.

II. Mixing

The biomass liquor is then mixed for from about 10 to about 300, alternatively from about 10 to about 240 minutes at a temperature in the range of from about 70° C. to about 120° C. In one embodiment, the biomass liquor is mixed at a temperature in the range of from about 70° C. to about 100° C., alternatively in the range of from about 85° C. to about 95° C. In one embodiment, the biomass liquor is mixed for from about 30 to about 300 minutes; alternatively from about 30 to about 120 minutes; alternatively from about 30 to about 60 minutes. Mixing can be continuous or sporadic.

In one embodiment, the dry biomass is mixed with acetone at a temperature in the range of from about 75° C. to about 85° C., preferably about 80° C., for about 55 to about 65, preferably about 60, minutes.

Mixing may be performed by any traditional means of mixing compositions. For example, the mixing may be performed by using a mixing means selected from propellers, turbines, screw conveyors, or mixtures thereof. In one embodiment, the mixing is performed by using a plug flow concept with a screw conveyor.

In one embodiment, the mixing is performed by using mixing means with a Power/Volume ratio of from about 0.001 KW/m$^3$ to about 100 KW/m$^3$.

In a continuous process embodiment, a plug flow concept including a mechanical transportation system such as a screw conveyor is used as the mixing means.

III. Separation

The polyhydroxyalkanoate is then separated from the biomass liquor to form a PHA-enriched liquor. The separation occurs at a temperature of at least about 50° C., preferably at least 70° C. Without being limited by theory, it is believed that gelling occurs at temperatures less than about 50° C. resulting poor reliability/yield.

Means of separating the biomass from the biomass liquor include filtration and/or centrifugation. In one embodiment, hot filtration is used to separate the polyhydroxyalkanoate from the biomass liquor. As used herein, the term "hot filtration" refers to filtering at a temperature of at least about 40° C., preferably at least about 50° C. In one embodiment, hot centrifugation is used to separate the polyhydroxyalkanoate from the biomass liquor. As used herein, "hot centrifugation" refers to centrifugation that occurs at a temperature of at least about 40° C., preferably at least about 50° C. In one embodiment, the filtration or centrifugation occurs at a temperature of at least about 70° C.; alternatively at about 80° C., alternatively at about 90° C.

In one embodiment, high pressure centrifuges are utilized in order to accommodate the higher temperatures and enhance the separation reliability.

IV. Precipitation

The PHA-enriched liquor is then mixed with water to form precipitated PHA and an impure solvent liquor. The water is combined with the PHA-enriched liquor in the ratio of from at least 0.35 parts water to about one part solvent, alternatively, from about 0.35 to about 3 parts water to about one part solvent, alternatively, from about 1 parts water to about one part solvent.

In one embodiment, the water is combined with the PHA-enriched liquor in the ratio of from about 0.75 to about 1.5 parts water to about 1 part solvent.

In one embodiment, when the PHA-enriched liquor is mixed with the water, the PHA-enriched liquor is cooled to a temperature of from about 20° C. to about 45° C.

Without being limited by theory, it is believed that too little water results in swelling/gelling and entrapment of solvents and/or other impurities in the gel. Further without being limited by theory, it is believed that excess water results in higher solvent recovery/recycling and handling costs.

The PHA-enriched liquor and water may be mixed together by a mixing means selected from propellers, turbines, homogenizers, layers of water coated sheets, moving belts, high shear mixers, and combinations thereof. Any tip speed and P/V (Power to Volume) ratios are selected to obtain the desired product morphology. By using a propeller mixing means having both radial and vertical mixing enables particles to be formed. By using turbine mixing means, fibers or fibrous PHA product may be formed. By using homogenizer mixing means, fine particles that may agglomerate later may be formed.

Use of a propeller mixing means having a P/V ratio of from about 0.0005 to about 1 result in particles having a size of around 10 microns to around 2 mm. Use of a turbine type with a P/V ratio of from about 0.005 to about 10 results in fibers having a size of less than about 5 mm.

The water may be added to the PHA-enriched liquor or the PHA-enriched liquor may be added to the water. Without being limited by theory, it is believed that this selection can impact the morphology of the resulting PHA material.

When the PHA-enriched liquor is added to water, a thick chunk of agglomerate or fibrous spindle can be obtained without mixing or with mild mixing. Use of a turbine mixing means can result in fibers or fibrous spindles. The rate of addition of water and the tip-speed can be varied to obtain small or large fibrous spindles. The use of a high shear homogenizer can help break up the fibers or agglomerates into smaller particles. Another option is to add the PHA-enriched liquor to water coated surface or filters to enable precipitation of the PHA into films, sheets, pulp, etc.

When the water is added to the PHA-enriched liquor, the PHA-enriched liquor and the water can be mixed together by a means selected from propeller, turbine, high shear, and mixtures thereof. Where a propeller is used, the P/V ratio may be from about 0.0001 to about 100 and the resulting morphology of the PHA is typically particles. Where a turbine is used, the P/V ratio may be from about 0.001 to about 1000 and the resulting morphoogy of the PHA is typically fibrous. Where High Shear is used, the P/V ratio may be at least about 100, and may be a homogenizer. Where High Shear is used, the resulting morphology of the PHA is typically powder. Without being limited by theory, it is believed that mild mixing with both radial and vertical flows should enable good precipitation with few gelling issues.

The water addition rate during a batch process may be greater than about 10 minutes of water addition. During a continuous process, the mixing of the water with the PHA-enriched liquor should be such that it is in a similar ratio of water to enriched liquor. During a continuous process, water may be added through a pump that is capable of generating sufficient velocity to clear any fine particles at the port of entry. Preferably, water injection through fine nozzles immersed in solution is avoided.

V. Recovery

The precipitated PHA is then recovered from the impure solvent liquor. Filtration may be used to recovery the precipitated PHA from the impure solvent liquor to produce recovered precipitated PHA and the remainder impure solvent liquor.

In addition to filtration, the recovered precipitated PHA may be squeezed and/or placed under pressure in order to remove any remainder impure solvent liquor.

In addition to filtration and/or other recovery means, the recovered precipitated PHA may then be washed with a solvent selected from acetone, methyl ethyl ketone, lower chain ketones, and mixtures thereof.

VI. Drying

After recovery of the recovered precipitated PHA, in one embodiment, the recovered precipitated PHA is dried by traditional means to remove any remainder impure solvent liquor.

VI. Recycling of Solvent

After the step of recovering the precipitated PHA from the impure solvent liquor, the solvent liquor may be recovered and recycled and/or re-used by traditional means in the processes and methods herein. The wash solvent filtrate with less than 10% water can be recycled directly to extraction and the filtrates with higher than 10% (preferably higher than 5% water) can be distilled to recover acetone for recycle.

VII. Optional Post-Treating with Oxidizing Agents or Surfactants

After the precipitated PHA is recovered, it may be desirable to further post-treat the PHA with either an oxidizing/bleaching agent or a surfactant in order to remove undesirable color bodies and/or odors. When used herein, oxidizing agents may be used in the amount of from a bout 0.0001 to about 0.5 parts oxidizing agent to about 1 part PHA, alternatively about 0.01 part oxidizing agent to about 1 part PHA. When peroxide is used, it is typically 0.01 part active peroxide to 1 part PHA is used as a dilute form (i.e. dispersed in water). When used herein, surfactants may be used in the range of about 0.005 part surfactant to about 1 part PHA.

Oxidizing/bleaching agents useful herein include air, hydrogen peroxide (H2O2), hypochlorites, bleach compounds including chlorine, bromine, and/or iodine oxidizing compounds, benzoyl peroxide, C9OBS, perborates, and mixtures thereof.

Surfactants useful herein include amine oxide, AES, and other common surfactants, and mixtures thereof.

Washing with surfactants and/or treating with oxidizing agents may result in removal of color bodies resulting in mild to significant color improvement (a whiter sample after treatment), removal of bio-odors, and/or reduction in impurities.

The oxidizing agents and/or surfactants can be used to treat the polyhydroxyalkanoate by washing the wet polymer with the oxidizing agent and/or surfactant e oxidizing agent (eg. H2O2) and/or by utilizing a dilute solution during the drying of the polymer.

The use of oxidizing agents during the drying of the Polyhydroxyalkanoate is especially useful if the impurities that are desired to be removed are known to be oxidizable, (such as tri acetone amine impurities from the acetone-water extraction/precipitation process).

VIII. Optional Process Parameters

As discussed above, depending on the type of morphology (flake, fiber, powder, film) desired in the precipitated PHA, process parameters can be altered to obtain such morphologies. For instance, the (a) water addition order, rate, temperature and ratio along with (b) type of mixing such as mild (propeller), moderate (turbine) and high shear homogenizer define the morphology of the precipitated polymer.

Apart from that the method of precipitation (mixing and water addition) can be used as tools to enable the neat polymers morphology (flake, fiber, powder, film) and enhance the purity of the product.

Although great care has been taken herein to provide guidance as to the selection of such parameters, one of ordinary skill will recognize that the optimal range of unit operating conditions or individual devices could vary according to the type of raw biomass.

Therefore, the following examples further describe and demonstrate the preferred embodiments within the scope of the present invention. The examples are given solely for the purpose of illustration, and are not to be construed as limitations of the present invention since many variations of the present invention are possible without departing from its spirit and scope.

EXAMPLES

Example 1

Acetone-Water Process

To 100 Kg of dried biomass containing approximately 60% PHA (Polyhydroxy Butyrate and Hexanoate copolymer with about 9 mole % of Hexanoate), is added approximately 900 kg of acetone (recycle, wash or fresh acetone with water content of 3%) with moderate mixing to form a slurry. The mixture of biomass and acetone slurry is then heated to about 90° C. and held for about 1 hour to allow separation of PHA from the biomass to occur. This solution, held at the about 90° C. temperature and pressure of approximately 3 Bar is then transferred to the filter (Nutsche filter) or centrifuge under pressure. The spent biomass (solid) is separated from the solution containing PHA and acetone. The solution containing PHA and acetone is then transferred to a precipitation tank and simultaneously water is added at half the rate of the PHA-Acetone solution. Approximately 450 kg of water is used as a precipitating solvent. During precipitation, moderate mixing with P/V of 2 KW/m$^3$ is applied. The precipitated PHA with the solvent is transferred to another Nutsche filter or centrifuge and then the solvents are separated from the PHA to form a PHA cake and used solvent/filtrate. The cake of PHA is pressed to minimize the solvents entrapped within PHA. The filtrate with acetone and water (about 66% Acetone and 33% water) may then be distilled to recover acetone for recycled use. About 360 kg of fresh or recovered acetone is added to the wet PHA cake and used to wash the PHA cake with gentle mixing in the filter. The filtrate is then separated from the wet PHA cake. The wet cake is then pressed to remove as much as acetone and water as possible. The filtrate after wash with acetone and containing about less than 10% water can be used for extracting PHA. During the washing step, optionally use about 0.01 part of active H2O2 (diluted in water): 1 part PHA to enhance color and odor improvements. The wet PHA cake is dried through a rotary drier under vacuum and 60° C. About 55 kg of dry PHA is produced.

Example 2

Acetone-Water Process

About 13.05 grams of biomass containing about 60% PHA (Polyhydroxy Butyrate and Hexanoate copolymer 6.5 mole % Hexanoate) is mixed with 100 grams of acetone. The mixture is added to a lab set containing a reaction chamber with a sintered metal filter capable of handling moderate temperature and pressure. The reactor is then heated to 90° C. for one hour. The reactor is cooled to about 60° C. and the PHA is filter extracted through a 10 micron filter at the bottom of the reactor. The PHA is precipitated from the filtrate by adding to a heel of acetone-water mixture. Additional water is then added at a ratio of 0.5 parts of water for each 1.0 part of filtrate. The water and acetone are filtered from the precipitated PHA using a Buchner funnel with #40 Whatman filter paper. The filtered PHA is rinsed with acetone. The filtered PHA is spread out in a watch glass and allowed to air dry overnight. A PHA yield of about 80 to 85% is observed.

Example 3

Acetone-Water Process with H2O2 Treatment During Drying Process

About 13.05 grams of biomass containing about 60% PHA (Polyhydroxy Butyrate and Hexanoate copolymer 6.5 mole % Hexanoate) is mixed with 100 grams of acetone. The mixture is added to a lab set containing a reaction chamber with a sintered metal filter capable of handling moderate temperature and pressure. The reactor is then heated to 90° C. for one hour. The reactor is cooled to about 60° C. and the PHA is filter extracted through a 10 micron filter at the bottom of the reactor. The PHA is precipitated from the filtrate by adding to a heel of acetone-water mixture. Additional water is then added at a ratio of 0.5 parts of water for each 1.0 part of filtrate. The water and acetone are filtered from the precipitated PHA using a Buchner funnel with #40

Whatman filter paper. The filtered PHA is rinsed with acetone and then with water. The wet cake is dried in a closed container with some H2O2 solution added at the end of the drying process (~0.01 part H2O2 diluted in water: 1 PHA). A PHA yield of about 80 to 85% is observed.

Example 4

Acetone-Water Process with Amine Oxide Wash During Washing Step

To 222 Kg of dried biomass containing approximately 60% PHA (Polyhydroxy Butyrate and Hexanoate copolymer with about 6.7 mole % of Hexanoate), is added approximately 1800 kg of acetone with mixing to form a slurry. The mixture of biomass and acetone slurry is then heated to about 90° C. and held for about 1 hour to allow separation of PHA from the biomass to occur. This solution, held at the about 90° C. temperature and pressure of approximately 3 Bar is then transferred to the filter (Nutsche filter) under pressure. The spent biomass (solid) is separated from the solution containing PHA and acetone. The solution containing PHA and acetone is then transferred to a precipitation tank containing a seat of acetone and water while simultaneously water is added at half the rate of the PHA-Acetone solution. Approximately 900 kg of water is used as a precipitating solvent. The precipitated PHA with the solvent is transferred to another Nutsche filter and then the solvents are separated from the PHA to form a PHA cake and used solvent/filtrate. The cake of PHA is pressed to minimize the solvents entrapped within PHA. Four washes are performed on the PHA cake. 1) About 600 kg of acetone is added to the wet PHA cake and used to wash the PHA cake with gentle mixing in the filter. The acetone is then separated from the wet PHA cake by filtration. The wet cake is then pressed to remove as much acetone as possible. 2) About 600 kg of water is added to the wet PHA cake and used to wash the PHA cake with gentle mixing in the filter. The water is then separated from the wet PHA cake by filtration. The wet cake is then pressed to remove as much water as possible. 3) About 600 kg of a 0.32% solution of Alkyldimethyl Amine Oxide is added to the wet PHA cake and used to wash the PHA cake with gentle mixing in the filter. The Alkyldimethyl Amine Oxide is then separated from the wet PHA cake by filtration. The wet cake is then pressed to remove as much Alkyldimethyl Amine Oxide as possible. 4) About 600 kg of water is added to the wet PHA cake and used to wash the PHA cake with gentle mixing in the filter. The water is then separated from the wet PHA cake by filtration. The wet cake is then pressed to remove as much water as possible. The wet PHA cake is dried under vacuum and 60° C. About 122 kg of dry PHA is produced.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An improved process for extracting polyhydroxyalkanoate from a biomass containing the polyhydroxyalkanoate comprising the steps of:
   a) combining the biomass containing the polyhydroxyalkanoate with a solvent selected from the group consisting of lower chain ketones, and mixtures thereof to form a biomass liquor wherein the biomass liquor comprises less than about 25% water;
   b) mixing the biomass liquor for from about 10 to about 300 minutes at a temperature in the range of from about 70° C. to about 120° C.;
   c) separating the polyhydroxyalkanoate from the biomass liquor to form a PHA-enriched liquor, wherein the separating occurs at a temperature of at least about 40° C.;
   d) mixing the PHA-enriched liquor with water to form precipitated polyhydroxyalkanoate and an impure solvent liquor, wherein the water is mixed with the PHA-enriched liquor in the ratio of from at least about 3 parts water to one part polyhydroxyalkanoate; and
   e) recovering the precipitated polyhydroxyalkanoate from the impure solvent liquor.

2. A process according to claim 1 wherein the solvent is selected from the group consisting of acetone, methyl ethyl ketone, and mixtures thereof.

3. A process according to claim 1 wherein the biomass liquor comprises the solvent and the polyhydroxyalkanoate in a ratio of from at least about 5 to about 30 parts solvent to about one part polyhydroxyalkanoate.

4. A process according to claim 2 wherein during the step of mixing the biomass liquor the mixing is performed by using mixing means selected from the group consisting of propellers, turbines, screw conveyor, and mixtures thereof.

5. A process according to claim 4 wherein the mixing means has a Power/Volume ratio of from about 0.001 KW/m$^3$ to about 100 KW/m$^3$.

6. A process according to claim 1 wherein the process is a continuous process wherein during the step of mixing the biomass liquor, the mixing is performed by using a plug flow concept with a screw conveyor.

7. A process according to claim 1 wherein the biomass liquor comprises less than 8% water.

8. A process according to claim 1 wherein the biomass liquor comprises no measurable quantity of water.

9. A process according to claim 1 wherein the separating the polyhydroxyalkanoate from the biomass liquor is by filtration and/or centrifugation.

10. A process according to claim 9 wherein the separating of the polyhydroxyalkanoate from the biomass liquor occurs at a temperature of at least about 70° C.

11. A process according to claim 1 wherein the water is mixed with the PHA-enriched liquor in the ratio of from about 0.4-1 part of water to about 1 part of solvent.

12. A process according to claim 1 wherein in step (d) the water is added to the PHA-enriched liquor.

13. A process according to claim 1 wherein in step the PHA-enriched liquor is added to the water.

14. A process according to claim 12 wherein in step (d) the PHA-enriched liquor and water are mixed together by a means selected from the group consisting of propeller, turbine, high shear, and mixtures thereof.

15. A process according to claim 13 wherein in step (d) the PHA-enriched liquor and water are mixed together by a means selected from the group consisting of high shear, layers of water coated sheets or moving belts and mixtures thereof.

16. A process according to claim 1 wherein in the step of mixing the PHA-enriched liquor with water to form precipitated polyhydroxyalkanoate and an impure solvent liquor, the PHA-enriched liquor is cooled to a temperature of from about 20° C. to about 45° C. and wherein in step (e), the precipitated polyhydroxyalkanoate recovery from the impure solvent liquor is by filtration and/or centrifugation to produce recovered precipitated polyhydroxyalkanoate and remainder impure solvent liquor.

17. A process according to claim 16 wherein after recovery by filtration and/or centrifugation, the recovered precipitated polyhydroxyalkanoate is squeezed and/or pressurized to remove remainder impure solvent liquor water.

18. A process according to claim 17 wherein in step (e), the recovered precipitated polyhydroxyalkanoate is then washed with a solvent selected from the group consisting of acetone, methyl ethyl ketone, and mixtures thereof.

19. A process according to claim 17 wherein the process further comprises drying the recovered precipitated polyhydroxyalkanoate.

20. A process according to claim 1 wherein after the step of recovering the precipitated polyhydroxyalkanoate from the impure solvent liquor, the process further comprises the step:
   f) treating the precipitated polyhydroxyalkanoate with oxidizing agents or mild surfactants or mild bleaches to enhance color and odor.

21. A process according to claim 19 wherein the process further comprises recovering and recycling the remainder impure solvent liquor.

22. An improved process for extracting polyhydroxyalkanoate from a biomass containing the polyhydroxyalkanoate comprising the steps of:
   a) combining the biomass containing the polyhydroxyalkanoate with a solvent selected from the group consisting of acetone, methyl ethyl ketone, and mixtures thereof to form a biomass liquor wherein the biomass liquor comprises less than about 5% water;
   b) mixing the biomass liquor for from about 30 to about 240 minutes at a temperature in the range of from about 70° C. to about 120° C.;
   c) separating the polyhydroxyalkanoate from the biomass liquor to form a PHA-enriched liquor, wherein the separating occurs at a temperature of at least about 50° C.;
   d) mixing the PHA-enriched liquor with water to form precipitated polyhydroxyalkanoate and an impure solvent liquor, wherein the water mixed with the PHA-enriched liquor in the ratio of from about 5 parts to about 30 parts water to about one part polyhydroxyalkanoate; and
   e) recovering the precipitated polyhydroxyalkanoate from the impure solvent liquor;
wherein the polyhydroxyalkanoate comprises at least two randomly repeating monomer units, wherein the first randomly repeating monomer unit has the structure:

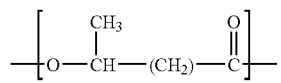

and the second or higher randomly repeating monomer unit has the structure:

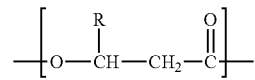

wherein R is a $C_2$ to $C_7$ alkyl or a mixture thereof; wherein from about 75 mol % to about 99 mol % of the randomly repeating monomer units have the structure of the first randomly repeating monomer unit and from about 1 mol % to about 25 mol % of the randomly repeating monomer units have the structure of the second randomly repeating monomer.

23. A process according to claim 9 wherein the separating of the polyhydroxyalkanoate from the biomass liquor occurs at a temperature of at least about 85° C.

* * * * *